United States Patent
Shih

(10) Patent No.: US 7,515,317 B2
(45) Date of Patent: Apr. 7, 2009

(54) COMPENSATING A ZIPPER IMAGE BY A K-VALUE

(76) Inventor: Chen-Hsiang Shih, No. 37-3, Yung-Feng Lane, Ho-Ming Village, Hsiu-Shui Hsiang, Chang-Hua Hsien (TW)

(*) Notice: Subject to any disclaimer, the term of this patent is extended or adjusted under 35 U.S.C. 154(b) by 791 days.

(21) Appl. No.: 10/013,887

(22) Filed: Dec. 10, 2001

(65) Prior Publication Data

US 2003/0107778 A1    Jun. 12, 2003

(51) Int. Cl.
- H04N 1/00 (2006.01)
- H04N 1/024 (2006.01)
- H04N 1/03 (2006.01)
- H04N 1/04 (2006.01)
- H04N 1/047 (2006.01)

(52) U.S. Cl. .................. 358/513; 358/483; 358/505; 358/474; 358/514; 358/448; 358/482; 358/463; 382/275; 382/269; 348/262; 348/264; 348/275; 348/315; 250/208.1; 250/214 C

(58) Field of Classification Search .............. 382/275, 382/266–269, 199, 162, 299; 345/611; 358/483, 358/505, 474, 494, 1.9, 514, 448, 528, 504, 358/512, 513, 482, 463, 582; 348/369, 262, 348/264, 275, 315; 250/208.1, 208.3, 370.15, 250/214 C, 200, 206

See application file for complete search history.

(56) References Cited

U.S. PATENT DOCUMENTS 4,703,363 A * 10/1987 Kitamura .................. 358/448
4,774,569 A * 9/1988 Morton et al. ............ 348/107
4,873,570 A * 10/1989 Suzuki et al. ............. 358/515

(Continued)

FOREIGN PATENT DOCUMENTS

JP          10051603 A    * 2/1998

(Continued)

OTHER PUBLICATIONS

Yuzuki et al, "A 5732-Element Linear CCD Image Sensor", Aug. 1985, IEEE Transactions on Electron Devices, vol. ED-32, pp. 1541-1545.*

(Continued)

*Primary Examiner*—David K Moore
*Assistant Examiner*—Beniyam Menberu
(74) *Attorney, Agent, or Firm*—Stolowitz Ford Cowger LLP

(57) ABSTRACT

A method of compensating a zipper image by a K-value, and a method of calculating the K-value. Whether the nth primitive pixel of the mth line is obtained by primary line scan is determined. If the nth primitive pixel of the mth line is obtained by primary line scan, the nth primitive pixel of the mth line is compensated as the nth primitive pixel of the mth line minus a sum of the $(n-1)$th primitive pixel of the $(m-k)$th line and the $(n+1)$th primitive pixel of the $(m-k)$th line multiplied by the K-value. If the nth primitive pixel of the mth line is obtained by secondary line scan, the nth primitive pixel of the mth line is compensated as the nth primitive pixel of the mth line minus a multiplication of the K-value and a sum of the $(n-1)$th primitive pixel of the $(m+k)$th line and the $(n+1)$th primitive pixel of the $(m+k)$th line.

32 Claims, 5 Drawing Sheets

U.S. PATENT DOCUMENTS

| | | | | |
|---|---|---|---|---|
| 4,953,014 | A * | 8/1990 | Takaragi | 358/528 |
| 4,974,072 | A * | 11/1990 | Hasegawa | 358/514 |
| 5,055,855 | A * | 10/1991 | Nishio | 347/30 |
| 5,070,414 | A * | 12/1991 | Tsutsumi | 358/466 |
| 5,355,164 | A * | 10/1994 | Shimoyama et al. | 348/243 |
| 5,528,274 | A * | 6/1996 | Hyodo | 347/172 |
| 5,528,296 | A * | 6/1996 | Gove et al. | 348/275 |
| 5,703,845 | A * | 12/1997 | Audoin et al. | 369/44.41 |
| 5,859,712 | A * | 1/1999 | Kim | 358/504 |
| 5,920,646 | A * | 7/1999 | Kamon | 382/173 |
| 5,940,125 | A * | 8/1999 | Suganuma | 348/243 |
| 5,995,675 | A * | 11/1999 | Hwang | 382/268 |
| 6,034,724 | A * | 3/2000 | Nakamura | 348/241 |
| 6,034,794 | A * | 3/2000 | Suganuma | 358/518 |
| 6,034,795 | A * | 3/2000 | Smitt | 358/525 |
| 6,081,625 | A * | 6/2000 | Sakaue | 382/254 |
| 6,115,147 | A * | 9/2000 | Mizumoto et al. | 358/483 |
| 6,144,469 | A * | 11/2000 | Suganuma | 358/514 |
| 6,288,797 | B1 * | 9/2001 | Ueno | 358/443 |
| 6,316,761 | B1 * | 11/2001 | Yamaguchi | 250/208.1 |
| 6,330,081 | B1 * | 12/2001 | Scholten | 358/463 |
| 6,496,286 | B1 * | 12/2002 | Yamazaki | 358/514 |
| 6,507,364 | B1 * | 1/2003 | Bishay et al. | 348/242 |
| 6,567,192 | B1 * | 5/2003 | Toyomura et al. | 358/497 |
| 6,606,172 | B1 * | 8/2003 | Moro | 358/483 |
| 6,646,681 | B1 * | 11/2003 | Macy et al. | 348/241 |
| 6,665,454 | B1 * | 12/2003 | Silverbrook et al. | 382/299 |
| 6,674,903 | B1 * | 1/2004 | Cliquet | 382/199 |
| 6,678,000 | B1 * | 1/2004 | Sakata | 348/369 |
| 6,744,916 | B1 * | 6/2004 | Takahashi | 382/162 |
| 6,894,812 | B1 * | 5/2005 | Spears | 358/483 |
| 6,965,463 | B1 * | 11/2005 | Moritaku et al. | 358/513 |
| 2002/0186422 | A1 * | 12/2002 | Chang et al. | 358/474 |
| 2003/0063201 | A1 * | 4/2003 | Hunter et al. | 348/241 |

FOREIGN PATENT DOCUMENTS

JP     2001-201324     *   7/2001

OTHER PUBLICATIONS

Zhang et al, "Color Imaging for Digital Cameras With a Single CCD Sensor", Oct. 2000, Industrial Electronics Society, vol. 3, pp. 2007-2012.*

Bae et al, "3CCD Interpolation Using Selective Projection", Mar. 2005, Acoustics, Speech, and Signal Processing, vol. 3, pp. ii/605-ii/608.*

Harada et al, "A High-Resolution Staggered-Configuration CCD Imager Overlaid with an a-Si:H Photoconductive Layer", Aug. 1985, IEEE Transactions on Electron Devices, vol. 32, Issue 8, pp. 1499-1504.*

Yuzuki et al, "A 5732-Element Linear CCD Image Sensor", Aug. 1985, IEEE Transactions on Electron Devices, vol. 32, Issue 8, pp. 1541-1545.*

* cited by examiner

COMPENSATING A ZIPPER IMAGE BY A K-VALUE

BACKGROUND OF THE INVENTION

1. Field of the Invention

The invention relates in general to a method of compensating a zipper image, and more particularly, to a method of compensating a zipper image by using K-value and a method to calculate the K-value.

2. Description of the Related Art

FIG. 1 shows a staggered charge coupled device (CCD) of a scanner 100. As shown in FIG. 1, the scanner 100 is connected to a host computer 150. The scanner 100 includes a staggered CCD 110 that has one primary line and one secondary line for each color, an application specific integrated circuit (ASIC) 120, an image compensation buffer 130, and an I/O interface 140. Before scanning, the scanner 100 performs an image compensation operation so that an image compensation parameter is obtained and saved in the host computer 150.

When the staggered CCD 110 scans any part of a document, an image compensation parameter related to this part is retrieved from the host computer 150, and transmitted to the image compensation buffer 130 via the I/O interface 140. The intermittently scanned image scanned by the staggered CCD 110 is then corrected by the ASIC 120 according to the image compensation parameter transmitted from the image compensation buffer 130. The corrected image is then transmitted to the host computer for storage via the I/O interface 140.

When the staggered CCD scans an image, if the line distance between the primary line and the secondary line is short, the primary line is inevitably affected by the light reflected from the secondary line. Similarly, the light reflected from the primary line vice versa also affects the secondary line. The fidelity of the document (as shown in FIG. 2) is easily deteriorated. Further, after scanning with a staggered CCD, a so-called zipper image (as shown in FIG. 3) is likely to occur. The zipper image is more significant for a document having a black-and-white boundary. Such zipper image causes errors for image scanning. Currently, no answer for resolving the zipper image has been disclosed yet.

SUMMARY OF THE INVENTION

The present invention provides a method for compensating a zipper image using a K-value and a method to calculate the K-value. The K-value is mutually affected by the primary line (such as the odd pixel) and the secondary line (such as the even pixel) of the staggered CCD calculated according to a leading edge reference (LER) so that an appropriate K-value can be obtained.

The method of compensating a zipper image by the K-value is applicable to a scanner with a staggered CCD, of which each color has a primary line and a secondary line for scanning documents. First, determine whether the nth (n is a positive integer) pixel of the mth line (m is a positive integer) is scanned by the primary line. If the nth primitive pixel of the mth line is scanned by the primary line, the nth primitive pixel of the mth line is compensated as the nth compensated pixel of the mth line. The nth compensated pixel is obtained by the nth primitive pixel of the mth line subtracting a multiplication of the K-value and a sum of the (n−1)th pixel of the (m−k)th line and the (n+1)th pixel of the (m−k)th line. If the nth primitive pixel of the mth line is obtained from a secondary line, the nth pixel of the mth line is compensated as the nth compensated pixel of the mth line, which is equal to the nth primitive pixel of the mth minus a sum of the (n−1)th primitive pixel of the (m+k)th line and the (n+1)th primitive pixel of the (m+k)th line times the K-value.

In one preferred embodiment of the present invention, the K-value is a ratio constant for the mutual influence between the primary line and the secondary line. In addition, the K-value is calculated according to the leading edge reference.

The present invention further provides a method of using the leading edge reference to calculate the K-value, which is applicable to a scanner with a staggered CCD that has a primary line and a secondary line for each color for scanning a document. If the leading edge reference is the mth line, and the nth primitive pixel of the mth line is scanned by the primary line, the nth primitive pixel of the mth line minus the (n+1)th pixel of the mth line, and then divided by a sum of the (n−1)th pixel of the (m−k)th line and the (n+1)th pixel of the (m−k)th line to obtain the K.sub.n-value (the nth K-value). If the leading edge reference is the mth line, and the nth primitive pixel thereof is scanned by the secondary line, the nth primitive pixel of the mth line minus the (n+1) primitive pixel of the mth line, and then divided by a sum of the (n−1)th and the (n+1)th primitive pixels of the (m+k) line to obtain the K.sub.n-value (the nth K-value). The above steps are then repeated until the whole document is scanned. A sum of the resultant K.sub.1-value (the first K-value), the K.sub.3-value (the third K-value), and the K.sub.5-value (the fifth K-value), . . . , and the K.sub.n-value is divided by X to obtain the K-value, where X is larger than 0 and equal to (n+1)/2. The K-value is then used to compensate the zipper image.

According to the above, the present invention appropriately compensate the zipper image by properly calculating the K-value. Therefore, when a scanner with a staggered CCD scans a document, the scanner used in the present invention obtains a scanned image almost identical to the real image.

Both the foregoing general description and the following detailed description are exemplary and explanatory only and are not restrictive of the invention, as claimed.

DESCRIPTION OF THE PREFERRED EMBODIMENTS

When the pitch between the primary line and the secondary line scanned by a staggered CCD is very short, the primary line is affected by the light reflected from the secondary line while the secondary line is affected by the light reflected from the primary line vice versa. Therefore, the constant K-value related to the mutually influence of the primary line and the second line can be calculated while finding the leading edge reference. Since the structure of the primary line is the same as that of the secondary line, only the K-value for affecting the primary line by the secondary line is calculated. The compensation is performed by only determining the primary line or the second line.

Figure 1:
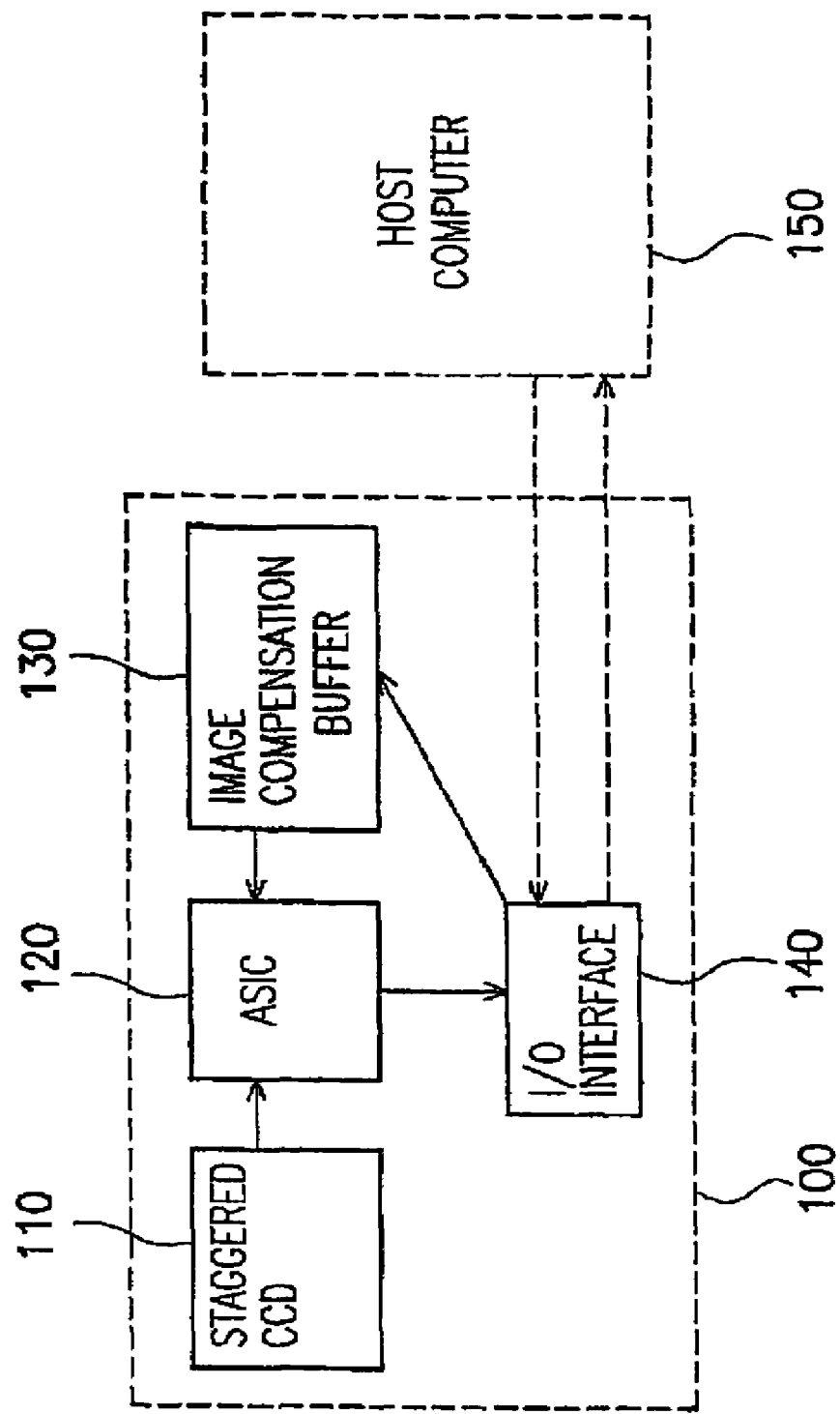
FIG. 1 shows a block diagram of a scanner with a staggered CCD.
Figure 2:
FIG. 2 shows a real image of a document.
Figure 3:
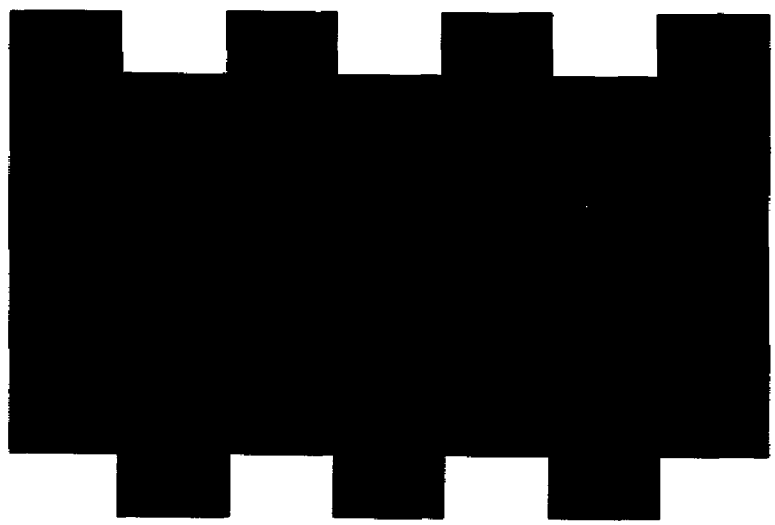
FIG. 3 shows the zipper image produced by scanning the document using the scanner with a staggered CCD.
Figure 4A:
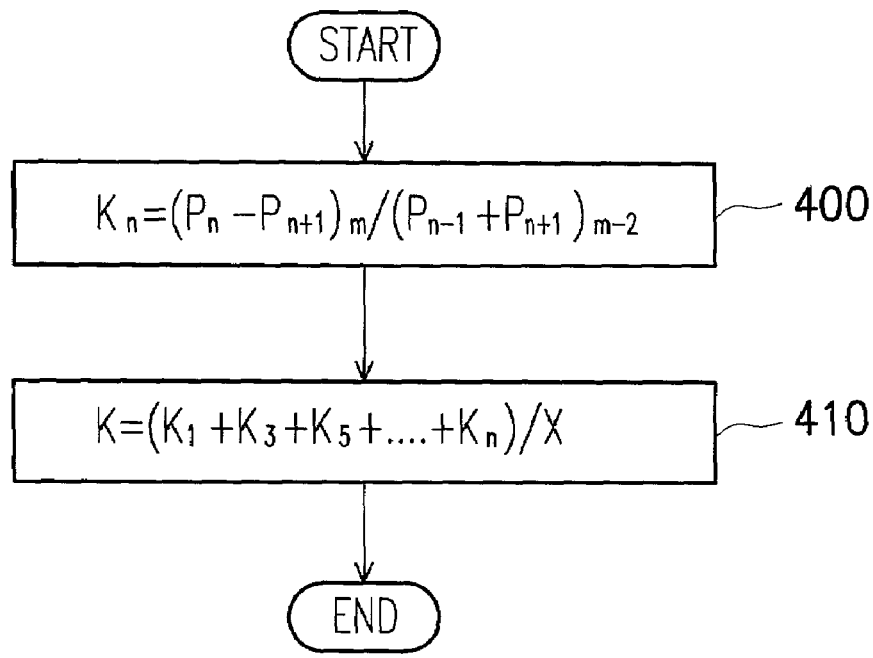
FIG. 4A shows an embodiment of the present invention, which uses the leading edge reference to calculate the K-value.
Figure 4B:
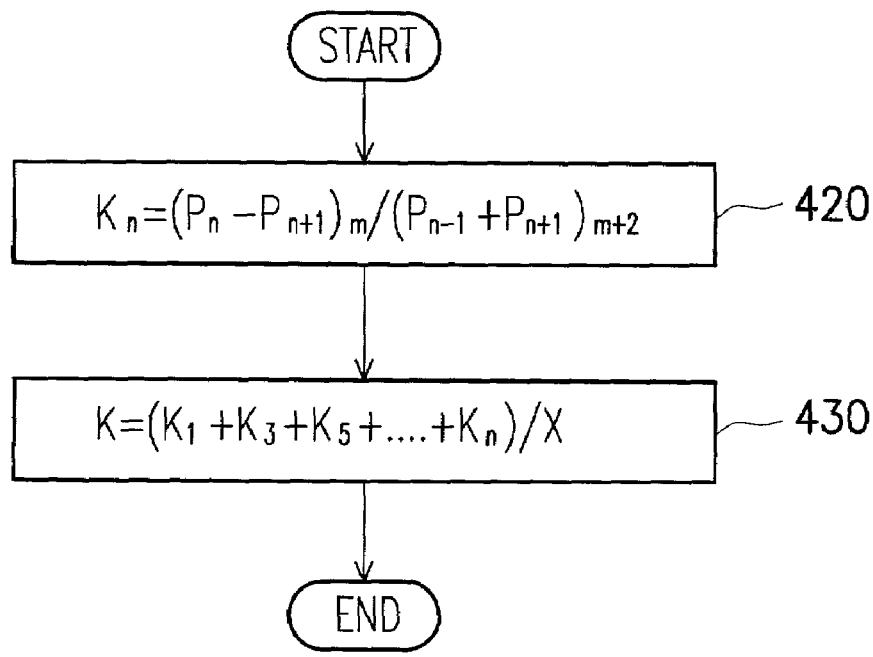
FIG. 4B shows another embodiment of the present invention, which uses the leading edge reference to calculate the K-value.

FIG. 4A shows an embodiment of the present invention that uses the leading edge reference to calculate the K-value. FIG. 4B shows another embodiment of the invention that uses the leading edge reference to calculate the K-value. In FIGS. 4A and 4B, assuming that the pitch between the primary line and the secondary line is two lines, the leading edge reference to be determined is called the mth (m is an integer) line, and X=(n+1)/2, where X is a positive integer.

To find the leading edge reference while using a scanner with a staggered CCD for scanning a document, a correction pattern containing a black-and-white pattern is required to determine the leading edge reference. In FIG. 4A, when the nth primitive pixel (P.sub.n).sub.m of the leading edge reference mth line is scanned by the primary line, the nth primitive pixel of the mth line minus the (n+1)th primitive pixel of the mth line (P.sub.n−1).sub.m and then divided by a sum of the (n−1)th primitive pixel (P.sub.−1).sub.m−2 and the (n+1)th primitive pixel (P.sub.n+1).sub.m−2 of the (m−2)th line to obtain the nth K-value. That is, K.sub.n=(P.sub.n−P.sub.n+1).sub.m/(P.sub.n−1+P.sub.n+1).sub.m−2 (as the step s400). The above steps are repeated until the whole document is scanned. A sum of the K.sub.1-value (the first K-value), the K.sub.3-value (the third K-value), the K.sub.5-value (the fifth K-value), . . . , and the K.sub.n-value (the nth K-value) is divided by X to obtain the K-value (such as step s410) to compensate the zipper image.

Referring to FIG. 4B, when the nth primitive pixel (P.sub.n). sub.m of the leading edge reference (the mth line) is scanned by the secondary line, the nth primitive pixel of the mth line (P.sub.n).sub.m minus the (n+1)th primitive pixel of the mth line (P.sub.n+).sub.m, and divided by a sum of the (n−1)th primitive pixel of the (m+2)th line (P.sub.n−1). sub.m+2 and the (n+1)th primitive pixel of the (m+2)th line (P.sub.n+1).sub.m+2 to obtain the nth K-value. That is, K.sub.n=(P.sub.n−P.sub.n+1).sub.m/(P.sub.n−1+P.sub.n+1). sub.m+2 (as step s420). The above steps are repeated until the whole document is scanned. A sum of the K.sub.1-value (the first K-value), the K.sub.3-value (the third K-value), the K.sub.5-value (the fifth K-value) . . . , the K.sub.n-value (the nth K-value) is then divided by X to obtain the K-value (in step s430) to compensate the zipper image.

Figure 5:
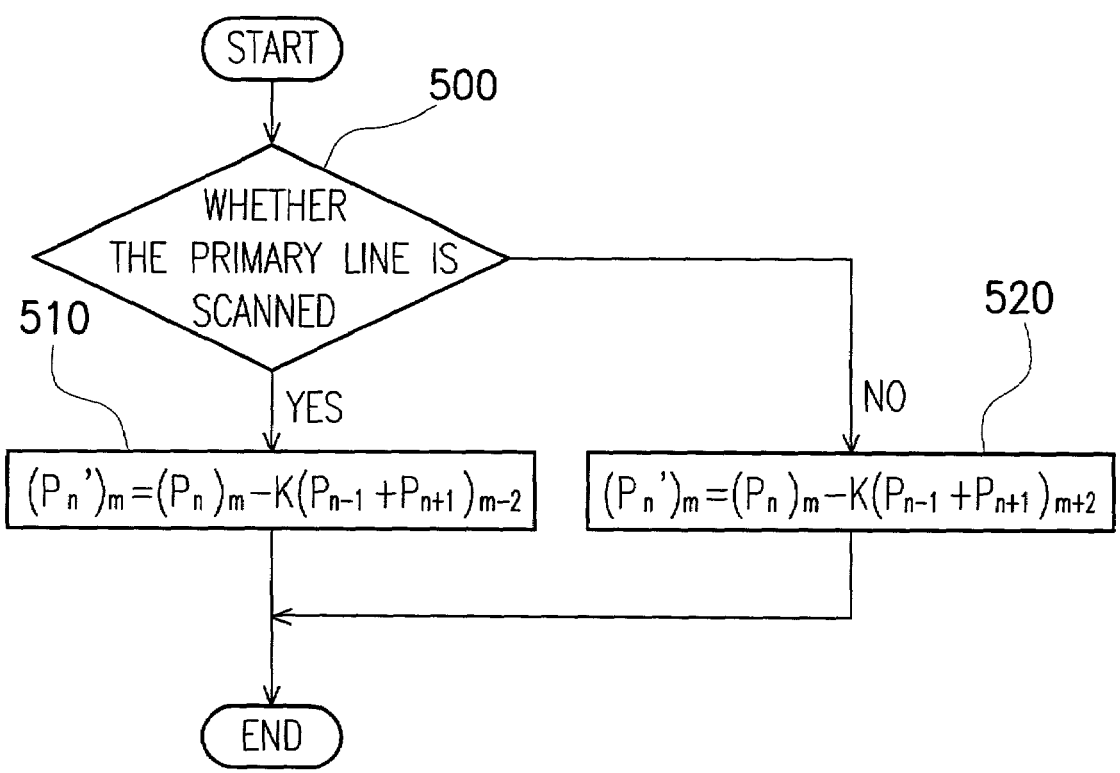
FIG. 5 shows a process flow for using the K-value to compensate the zipper image according to the present invention.

The above K-value is then used to compensate the zipper image. FIG. 5 shows a process flow of using the K-value to compensate the zipper image. In FIG. 5, the pitch between the primary line and the secondary line is two lines.

In this embodiment, whether the nth (n is a positive integer) primitive pixel of the mth line (m is positive integer) is scanned and obtained by the primary line is determined (In s500). If the nth primitive pixel of the mth line is scanned by the primary line, the nth primitive pixel of the mth line $(P_n)_m$ is compensated as the nth compensated pixel of the mth line $(P_n')m$. The $(P_n')_m$ is obtained by the nth primitive pixel of the mth line $(P_n)_m$ minus a multiplication of the K-value and the sum of the (n−1)th and (n+1)th primitive pixels of the (m−2)th line. That is, $(P_n')_m=(P_n)_m-K(P_{n-1}+P_{n+1})_{m-2}$(such as s510). If the nth primitive pixel of the mth line is scanned by the secondary line, the nth primitive pixel of the mth line $(P_n)_m$ is compensated as the nth compensated pixel of the mth line $(P_n')m$. The $(P_n')_m$ is obtained by the nth primitive pixel of the mth line $(P_n)_m$ minus a multiplication of the K-value and a sum of the (n−1)th and (n+1)th primitive pixels of the (m+2)th line. That is, $(P_n')_m=(P_n)_m-K(P_{n-1}+P_{n-1})_{m+2}$ (such as s520).

The above steps are repeated until the whole document is scanned so the zipper image can be properly compensated.

According to the above, the present invention has the following advantages.

1. The K-value calculated from the leading edge reference allows the zipper image produced by scanning a document using a scanner with a staggered CCD to be properly compensated.

Figure 6:
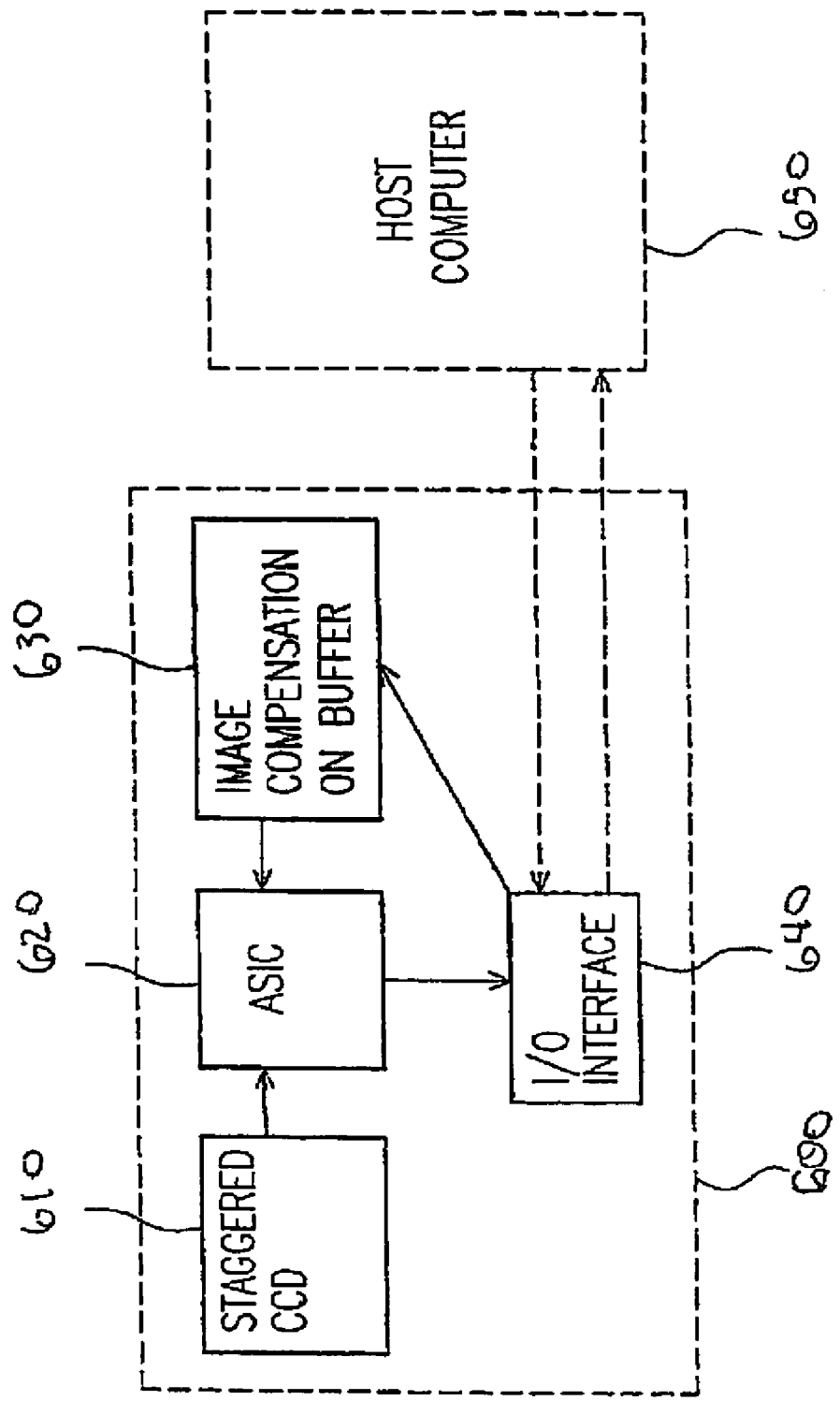
FIG. 6 shows a block diagram of a scanner with a staggered CCD.

FIG. 6 illustrates a staggered charge coupled device (CCD) of a scanner 600. As shown In FIG. 6, the scanner 600 is coupled to a host computer 650. The scanner 600 Includes a staggered CCD 610 having at least one primary line and at least one secondary line for one or more colors of the CCD, each line having a plurality of pixels, an application specific integrated circuit (ASIC) 620, an image compensation buffer 630, and an I/O interface 640. Before scanning, the scanner 600 may perform image compensation so that an image compensation parameter is obtained and saved in the host computer 650.

When the staggered CCD 610 scans any part of a document, an image compensation parameter related to this part is retrieved from the host computer 650, and transmitted to the image compensation buffer 630 via the I/O interface 640. The intermittently scanned image scanned by the staggered CCD 610 is then corrected by the ASIC 620 according to the image compensation parameter transmitted from the image compensation buffer 630. The corrected image is then transmitted to the host computer for storage via the I/O interface 640.

2. The scanned image is almost identical to the real image.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method, comprising:
   scanning an image with a staggered charge-coupled device (CCD) including a primary scanning line and a secondary scanning line for each color of the CCD, wherein the primary scanning line and the secondary scanning line are separated by a pitch of one or more lines;
   identifying a leading edge reference line of the image comprised of a number of pixels including a primitive pixel; and
   determining a compensation value for the image, wherein the compensation value is determined in part according to a mathematical operation comprising a pixel value associated with the primitive pixel and a pixel value associated with one or more pixels located on a scan line of the image, wherein the one or more pixels located on the scan line are separated from the number of pixels of the leading edge reference line by the pitch, and wherein the compensation value compensates for a zipper effect caused by a reflection of light between the primary scanning line and the secondary scanning line of the staggered CCD when the leading edge reference line and the scan line are scanned.

2. The method according to claim 1, further comprising:
   scanning the leading edge reference line with the primary scanning line; and
   scanning the scan line with the secondary scanning line.

3. The method according to claim 1, further comprising:
   performing the mathematical operation for each of the number of pixels to obtain a plurality of compensated pixel values; and summing the plurality of compensated pixel values to determine the compensation value, wherein the compensation comprises a constant.

4. The method according to claim 3, further comprising determining the plurality of compensated pixel values according to a difference between two pixels from the leading edge reference line divided by a sum of two pixels from the scan line.

5. The method according to claim 4, wherein the scan line is identified by the difference between the leading edge reference line and the pitch when the leading edge reference line is scanned by the primary scanning line and the scan line is identified by the sum of the leading edge reference line and the pitch when the leading edge reference line is scanned by the secondary scanning line.

6. The method according to claim 3, wherein the compensation value is further determined by dividing twice the sum of the plurality of compensated pixel values by the number of pixels plus one.

7. The method according to claim 4, wherein the two pixels from the leading edge reference line comprise the primitive pixel and a pixel adjacent to the primitive pixel, and wherein the two pixels from the scan line are separated by a pixel on the scan line that numerically corresponds to a position of the primitive pixel on the leading edge reference line.

8. A scanner, comprising:
a staggered charge-coupled device (CCD) configured to sense an image, wherein the staggered CCD includes a primary scanning line and a secondary scanning line associated with each color of the CCD;
an application specific integrated circuit (ASIC) configured to compensate the sensed image; and
a compensation buffer configured to provide a compensation parameter to the ASIC, wherein the scanner is configured to determine the compensation parameter for one or more pixel values associated with one or more pixels of the sensed image, the compensation parameter compensating for a zipper effect caused by a reflection of light between the primary scanning line and the secondary scanning line, wherein the compensation parameter is determined based at least in part on a mathematical operation including a first set of pixel values for one or more pixels of the secondary scanning line and a second set of pixel values for one or more pixels of the primary scanning line, wherein the first set of pixel values and the second set of pixel values are associated with different portions of the sensed image, and wherein the mathematical operation further includes a pitch between the primary scanning line and the secondary scanning line.

9. The scanner according to claim 8, wherein the compensation parameter associated with a primitive pixel of the primary scanning line is further based on two pixels from the secondary scanning line that are separated by a pixel that numerically corresponds to a position of the primitive pixel on the primary scanning line.

10. The scanner according to claim 8 wherein the compensation parameter associated with a primitive pixel of the secondary scanning line is further based on two pixels from the primary scanning line that are separated by a pixel that numerically corresponds to a position of the primitive pixel on the secondary scanning line.

11. The scanner according to claim 9, wherein the mathematical operation further includes a sum of pixel values of the two pixels from the secondary scanning line.

12. The scanner according to claim 10 wherein the mathematical operation further includes a sum of pixel values of the two pixels from the primary scanning line.

13. The scanner according to claim 8, wherein the pitch comprises one or more scanning lines.

14. The method according to claim 4, further comprising:
determining a compensated pixel corresponding to the primitive pixel by calculating a product of the compensation value and the sum of the two pixels from the scan line, and subtracting the product from the pixel value associated with the primitive pixel.

15. The scanner according to claim 11 wherein the scanner is further configured to:
determine a compensated pixel corresponding to the primitive pixel by calculating a product of the compensation parameter and the sum of pixel values of the two pixels from the secondary scanning line, and subtracting the product from the primitive pixel.

16. A method, comprising:
scanning an image with a staggered charge-coupled device (CCD) including a primary line and a secondary line, wherein the primary line and the secondary line are separated by a pitch (k) of one or more lines;
identifying a leading edge reference of the scanned image comprised of a number of pixels including a primitive pixel that is scanned by one or both of the primary line and the secondary line, wherein the scanned image comprising a number of m or more scanned lines and each of the scanned lines comprising a number of n or more pixels; and
determining a compensation value (K-value) for the image, wherein the compensation value is determined in part according to a pixel value associated with the primitive pixel and a pixel value associated with one or more pixels located on a scanning line separated from the leading edge reference by the pitch, wherein the compensation value compensates for zipper effects caused by an influence between the primary line and the secondary line of the staggered CCD, and wherein:
when a nth primitive pixel of the leading edge reference on a mth line is scanned by the primary line, the method further comprises compensating the nth primitive pixel according to a multiplication of the K-value with a sum of a (n−1)th primitive pixel of a (m−k)th line and a (n+1)th primitive pixel of the (m−k)th line and subtracting a result from the nth primitive pixel of the mth line; and
when the nth primitive pixel of the leading edge reference of the mth line is scanned by the secondary line, the method further comprises compensating the nth primitive pixel according to a multiplication of the K-value with a sum of a (n−1)th primitive pixel of a (m+k)th line and a (n+1)th primitive pixel of the (m+k)th line and subtraction of a result from the nth primitive pixel of the mth line.

17. The method according to claim 16, further comprising:
when the nth primitive pixel of the mth line is obtained from the primary line, obtaining a $K_n$-value by using the nth primitive pixel of the mth line minus a (n+1)th primitive pixel of the mth line, and dividing a result by a sum of a (n−1)th primitive pixel and a (n+1)th primitive pixel of a (m−k)th line; and
when the nth primitive pixel of the mth line is obtained from the secondary line, obtaining a $K_n$-value by using the nth primitive pixel of the mth line minus a (n+1)th primitive pixel of the mth line, and dividing a result thereof with a sum of a (n−1)th primitive pixel and a (n+1)th primitive pixel of the (m+k)th line.

18. The method according to claim 17, further comprising obtaining the $K_n$-values for an entire document and dividing a sum of a $K_1$-value, $K_3$-value, $K_5$-value, ... $K_n$-value by X wherein X=(n+1)/2 and >0 to obtain the K-value.

19. The method according to claim 16 wherein the K-value is a constant.

20. The method according to claim 16 wherein the K-value is a ratio constant of mutual influence between the primary line and the secondary line.

21. The method according to claim 16, wherein the K-value is calculated from a leading edge reference.

22. A method, comprising:
scanning an image with a staggered charge-coupled device (CCD) including a primary line and a secondary line, wherein the primary line and the secondary line are separated by a pitch (k) of one or more lines;
identifying a leading edge reference of the scanned image comprised of a number of pixels including a primitive pixel that is scanned by one or both of the primary line and the secondary line, wherein the scanned image comprises a number of m or more scanned lines and each of the scanned lines comprises a number of n or more pixels; and
determining a compensated pixel value ($K_n$-value) for the primitive pixel, wherein the compensation value is determined in part according to a pixel value associated with one or more of the number of pixels of the leading edge reference and a pixel value associated with one or more pixels located on a scanning line separated from the leading edge reference by the pitch, and wherein the compensation value compensates for zipper effects caused by an influence between the primary line and the secondary line of the staggered CCD, wherein:
when a nth pixel is scanned from the primary line, the method further comprises subtracting a (n+1)th pixel from a nth pixel of a same mth line and dividing a result thereof by a sum of a (n−1)th pixel and a (n+1)th pixel of a same (m−k)th line to obtain the $K_n$-value; and
when the nth primitive pixel is scanned from the secondary line, the method further comprises subtracting a (n+1)th pixel of the mth line from a nth pixel of the mth line and dividing a result thereof by a sum of a (n−1)th pixel and a (n+1)th pixel of a (m−k)th line to obtain the $K_n$-value.

23. The method according to claim 22, further comprising repeating the subtractions and divisions for an entire document and dividing a sum of $K_1$-value, $K_3$-value, $K_5$-value, ... and $K_n$ by X (X=(n+1)/2 and >0) to obtain a compensation value for the entire image.

24. The method according to claim 22 wherein the compensation value is used to compensate a zipper image.

25. An apparatus, comprising:
means for scanning an image with a staggered charge-coupled device (CCD) including a primary line and a secondary line for each color of the CCD, wherein the primary line and the secondary line are separated by a pitch of one or more lines;
means for identifying a leading edge reference of the image comprised of a number of pixels including a primitive pixel, wherein the leading edge reference is scanned by one or both of the primary line and the secondary line; and
means for determining a compensation value for the image, wherein the compensation value is determined in part according to a pixel value associated with the primitive pixel and a pixel value associated with one or more pixels located on a scanning line of the image, wherein the primitive pixel is separated from the one or more pixels by the pitch, and wherein the compensation value compensates for a zipper effect caused by a reflection of light between the primary line and the secondary line of the staggered CCD.

26. The apparatus according to claim 25 further comprising:
means for obtaining a plurality of compensated pixel values for each of the number of pixels; and
means for summing the plurality of compensated pixel values to determine the compensation value, wherein the compensation value comprises a constant.

27. The apparatus according to claim 26 further comprising means for determining the plurality of compensated pixel values according to a difference between two pixel values from the leading edge reference divided by a sum of two pixel values from the scanning line.

28. The apparatus according to claim 27 wherein the scanning line is identified by the difference between the leading edge reference and the pitch when the leading edge reference is scanned by the primary line and the scanning line is identified by the sum of the leading edge reference and the pitch when the leading edge reference is scanned by the secondary line.

29. The apparatus according to claim 26, wherein the compensation value is further determined by dividing twice the sum of the plurality of compensated pixel values by the number of pixels plus one.

30. The method according to claim 1, wherein the leading edge reference line and the scan line are associated with different portions of the scanned image.

31. The method according to claim 2, wherein the leading edge reference line and the scan line are scanned concurrently.

32. The method according to claim 25, wherein the primitive pixel and the one or more pixels are scanned at the same time.

* * * * *

UNITED STATES PATENT AND TRADEMARK OFFICE
CERTIFICATE OF CORRECTION

PATENT NO. : 7,515,317 B2  Page 1 of 1
APPLICATION NO. : 10/013887
DATED : April 7, 2009
INVENTOR(S) : Shih It is certified that error appears in the above-identified patent and that said Letters Patent is hereby corrected as shown below:

At column 5, line 59, please replace "claim 8 wherein" with --claim 8, wherein--.
At column 6, line 1, please replace "claim 10 wherein" with --claim 10, wherein--.
At column 6, line 12, please replace "claim 11 wherein" with --claim 11, wherein--.
At column 7, line 7, please replace "claim 16 wherein" with --claim 16, wherein--.
At column 7, line 10, please replace "claim 16 wherein" with --claim 16, wherein--.
At column 7, line 47, please replace "(m-k)th" with --(m+k)th--.
At column 7, line 51, please replace ". . . and" with --. . ., and--.
At column 7, line 53, please replace "claim 22 wherein" with --claim 22, wherein--.
At column 8, line 22, please replace "claim 25 further" with --claim 25, further--.
At column 8, line 29, please replace "claim 26 further" with --claim 26, further--.
At column 8, line 34, please replace "claim 27 wherein" with --claim 27, wherein--.

Signed and Sealed this

Eighteenth Day of May, 2010

David J. Kappos
*Director of the United States Patent and Trademark Office*